Feb. 25, 1947.  M. R. WINKLER  2,416,463
SELECTOR FOR AUTOMATIC PHONOGRAPHS
Original Filed Oct. 23, 1941  5 Sheets-Sheet 1

INVENTOR.
Marion R. Winkler
BY John F. Eakins
ATTORNEY

Feb. 25, 1947. M. R. WINKLER 2,416,463
SELECTOR FOR AUTOMATIC PHONOGRAPHS
Original Filed Oct. 23, 1941   5 Sheets-Sheet 2

INVENTOR.
Marion R. Winkler
BY John F. Eakins
ATTORNEY

Feb. 25, 1947.　　　　M. R. WINKLER　　　　2,416,463
SELECTOR FOR AUTOMATIC PHONOGRAPHS
Original Filed Oct. 23, 1941　　5 Sheets-Sheet 3

INVENTOR.
Marion R. Winkler
BY John F. Eakins
ATTORNEY

Feb. 25, 1947. M. R. WINKLER 2,416,463
SELECTOR FOR AUTOMATIC PHONOGRAPHS
Original Filed Oct. 23, 1941   5 Sheets-Sheet 4

INVENTOR.
Marion R. Winkler
BY John F. Eakins
ATTORNEY

Feb. 25, 1947. M. R. WINKLER 2,416,463
SELECTOR FOR AUTOMATIC PHONOGRAPHS
Original Filed Oct. 23, 1941 5 Sheets—Sheet 5

INVENTOR.
Marion R. Winkler
BY John F. Eakins
ATTORNEY

Patented Feb. 25, 1947

2,416,463

UNITED STATES PATENT OFFICE 2,416,463

SELECTOR FOR AUTOMATIC PHONOGRAPHS

Marion R. Winkler, Hicksville, N. Y., assignor to J. P. Seeburg Corporation, Chicago, Ill., a corporation of Illinois Original application October 23, 1941, Serial No. 416,140. Divided and this application May 29, 1944, Serial No. 537,795

5 Claims. (Cl. 194—15)

This application is a divisional from my copending application Ser. No. 416,140, filed October 23, 1941, issued April 9, 1946, as Patent No. 2,398,067.

This invention relates to selectors for automatic phonographs and has for its principal object the provision of an improved phonograph selector.

One of the objects of the invention is to provide an improved selector which can be located in remote relation to the phonograph controlled thereby.

A further object of the invention is to provide a dial operated coin control selector in which the insertion of a coin conditions the selector for a plurality of dial operations corresponding to a single selection.

A further object of the invention is to provide a dial selector in which the impulser is freed from the dial by a return movement of the dial.

A further object of the invention is to provide an improved dial selector in which the operator is unable to interrupt the operation of the impulser and is unable to vary the rate of operation of the impulser by manipulations of the dial.

Other objects, advantages and capabilities of the invention will appear from the following description of a preferred embodiment thereof taken in conjunction with the accompanying drawings in which.

Figure 14:

Fig. 14 is a detail view showing the manner in which the wedge-shaped lug 54 is normally engaged between the furcations 52 and 53.

Figure 1:
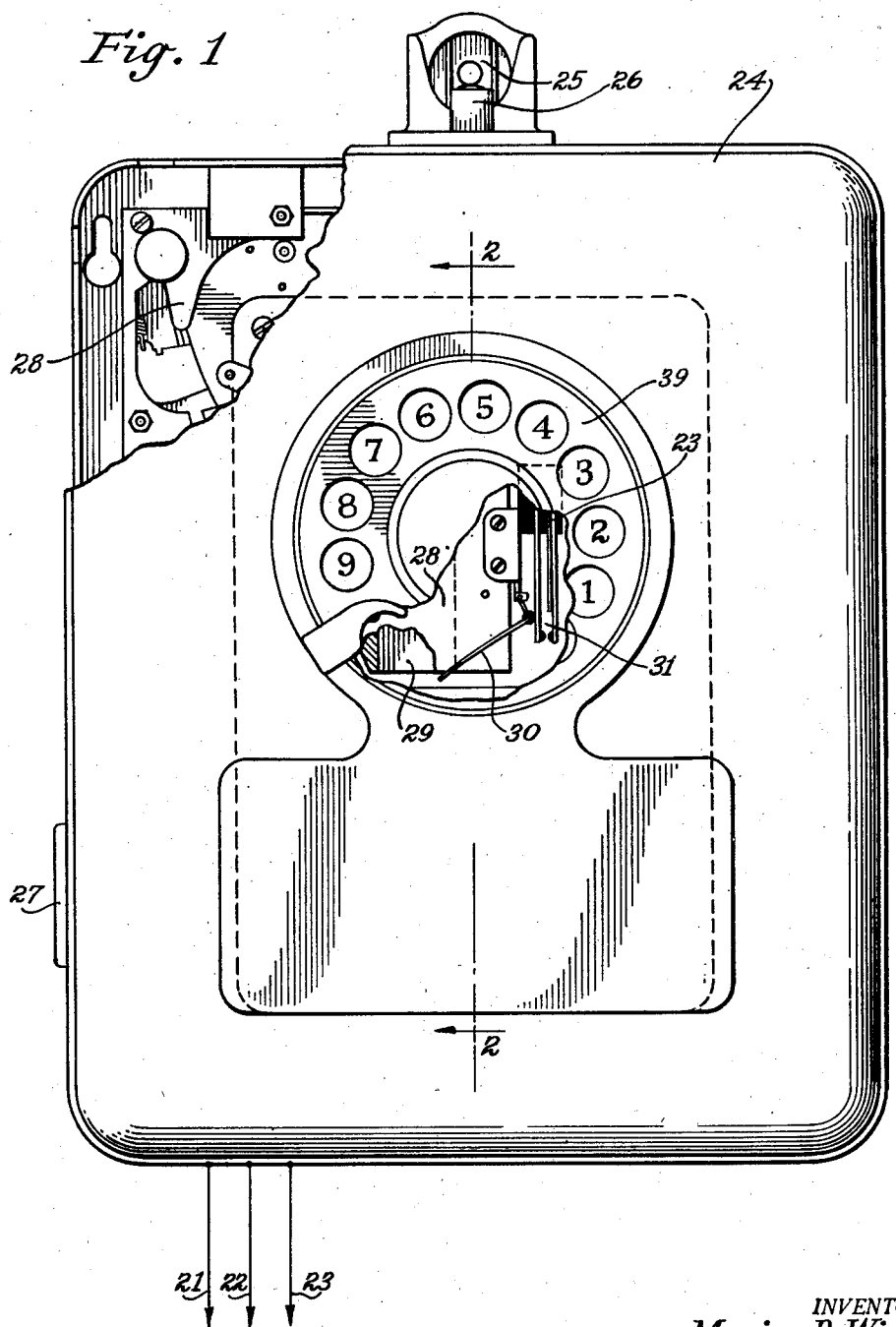
Fig. 1 is an elevational view partly broken away, showing the remote control cabinet or wall box of the selector.

The remote control unit as a whole is best seen in Fig. 1 being designated by the reference numeral 24. Three lines 21, 22 and 23 connect this remote control unit to the phonograph to be controlled. The line 23 supplies A. C. current of suitable voltage. The line 21 is the impulser line and the line 22 is the common line. The base of the cabinet carries a coin slot 25, a slug reject button 26 and a slug reject cup 27. The coin inserted in the slot 25 enters a slug rejecter 28. The slug rejecter retains a slug or spurious coin, which can be retrieved by pressing the button 26, whereupon the slug is returned to the reject cup 27. The accepted coin passes through the slug rejecter into a chute 29 which leads to a suitable coin receptacle (not shown).

A coin descending through the chute 29 hits a light lever 30 which effects the momentary closing of a switch 31. One side of the switch is connected to the A. C. wire 23, the other side being connected to a relay 32 mounted within the cabinet. The other side of the relay is connected to the common wire 22.

The armature 33 of the solenoid of the relay 32 is arranged so that it cooperates with a credit ratchet wheel 34. It will be understood that each time the relay 32 is energized, the armature 33 moves the ratchet wheel 34 one tooth in the counterclockwise direction.

Figure 7:
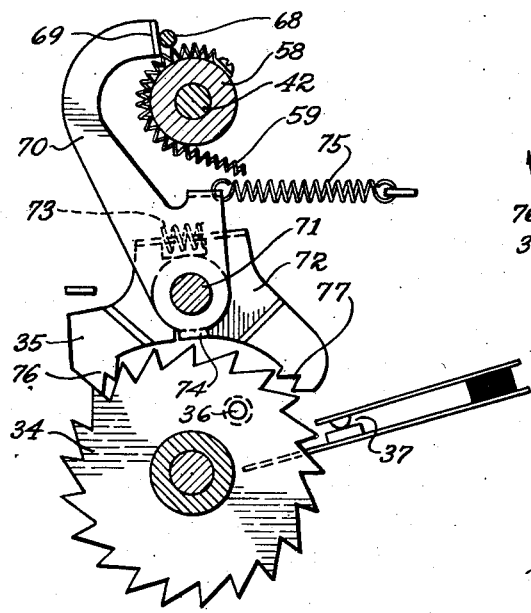
Fig. 7 is a sectional detail view taken on the line 7—7 of Fig. 2, showing the credit ratchet wheel and the elements coacting therewith in their normal condition before dialing.

The ratchet wheel 34 is normally engaged by an escapement dog 35 as shown in Fig. 7. It will readily be understood that each time the ratchet wheel 34 is moved in the counterclockwise direction, its teeth move the escapement member 35 outwardly so that it enters the next recess in the clockwise direction with respect to the recess in which it is shown engaging.

A pin 36 mounted on the ratchet wheel 34 is adapted to cooperate with a switch 37. In the normal condition of the ratchet wheel 34, the pin 36 is in engagement with the switch 37 holding this switch open. When, however, one or more coins are inserted in the coin slot 25, the ratchet wheel 34 is displaced by a corresponding number of teeth from its initial position in which the switch 37 is open. It will be understood that it is not until the ratchet wheel 34 is moved back step by step to its initial position, that the switch 37 opens again.

One side of the switch 37 is connected to the common wire 22. The other side of the switch 37 is connected to one side of a switch 38, the other side of which switch is connected to the signal line 21. It will thus be seen that if the switch 37 is closed, which condition requires the insertion of a coin or coins, and the switch 38 is closed a certain number of times, then the line 22 is connected the same number of times to the line 21 and the same number of impulses is transmitted over the lines 21 and 22.

The remote control unit is provided with a dial 39 which is rigidly mounted on a sleeve 40 which is rotatably mounted in a bearing 41 rigidly carried by the front wall of the cabinet. The sleeve 40 is rotatably mounted on a shaft 42 which extends through the sleeve 40 and also extends through a rear bearing 43. The sleeve 40 is provided with a head on the left-hand end and at the right-hand end, as viewed in Fig. 2, it has secured to it a collar 44 which irremovably mounts the dial upon the cabinet.

A spring 45 secured to the housing and to the collar 44 biases the dial 39 to its initial position determined by suitable stops 46 on the dial and the adjacent cabinet wall. On the rear or innermost end of the collar 44 is rigidly mounted a resilient bifurcated member 47. The member 47 may suitably be of substantially disc formation with a large segmental slot 48 which renders the intermediate portion 49 between the ends of the slot 48 very resilient in a direction parallel to the axis of the dial.

Figure 4:
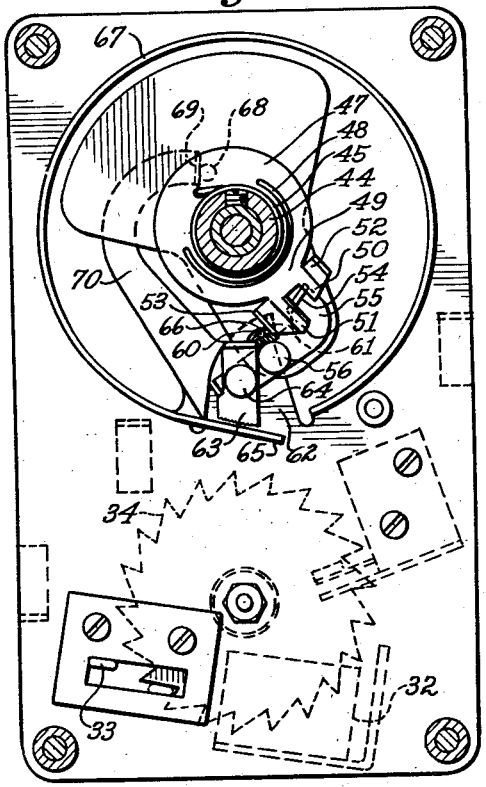
Fig. 4 is a sectional view taken on the line 4—4 of Fig. 2.

Adjacent the portion 49 the member 47 is provided with two furcations or bifurcated projections 50 and 51. The projection 50 is considerably shorter in the radial direction than is the projection 51 as best seen in Fig. 4. The outer sides of the members or projections 50 and 51 are provided with extensions 52 and 53, respectively, which are bent upwardly or forwardly out of the general plane of the member 47, these portions 52 and 53 providing effectual cams for the purposes hereinafter to be noted. It may here be remarked that between the two projections 50 and 51 is received the wedge-shaped end 54 of an outwardly turned lug of a latch member 55.

The latch member 55 is pivotally mounted at 56 upon a member 57 which is rigidly carried by a sleeve 58. The sleeve 58 is mounted on the shaft 42 immediately behind the sleeve 44. These two elements are free for independent movement upon the shaft 42.

Figure 5:
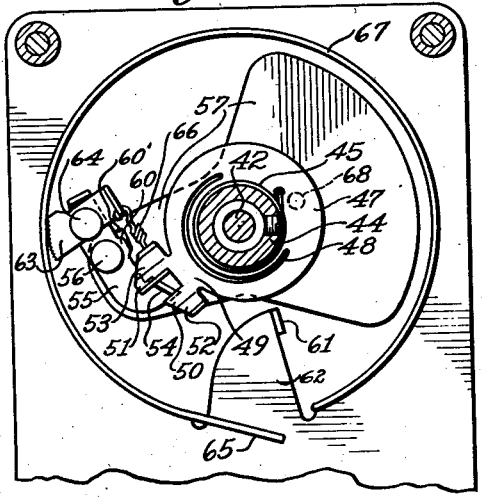
Fig. 5 is a similar view showing the elements in a different position of adjustment.

The sleeve 58 and the member 57 are strongly biased in the counterclockwise direction by means of a strong spring 59, one end of which is secured to the sleeve member 58, the other being secured to a suitable point on the cabinet. The normal position of the member 57 is attained when a rearward projection 60 on the latch member 55 is moved into contact with a lug 61. The lug 60 extends rearwardly through a suitable opening 60' in the member 57 as best seen in Fig. 5. The lug 61 is carried by a plate 62 rigidly mounted on the interior of the cabinet.

It will be noted that when the lug 60 approaches the lug 61, the latch member 55 is swung in the counterclockwise direction about its pivot 56. At its end remote from the wedge-shaped projection 54, the latch member 55 carries a dog 63 which is pivoted to the latch member 55 at 64. A spring 66 connected to an upturned lug on the dog 63 and to the base of the outwardly directed wedge portion 54, tends to rotate the dog 63 in the clockwise direction around its pivot. This movement is limited by abutments as shown in Fig. 6.

The normal relation of the elements is shown in Fig. 4, the wedge-shaped portion 54 of the latch member 55 being located between the furcations 50 and 51 of the member 47. The springs 59 firmly holds the lug 60 of the latch member 55 against the lug 61 so that the latch member 55 is forced in the counterclockwise direction until its lug 60 engages the left-hand end of the opening 60'. The spring 66 holds the dog 63 in abutting relation to the latch member 55 at that time.

The outer milled or roughened end of the dog 63 is directed towards and in slightly spaced relation to a flange portion 65 which is an extension of the flange 67 in tangential relation thereto or with considerably less curvature than the substantially circular flange 67. This flange is formed integrally with the plate 62 and is so located that it can be engaged by the outer end of the dog 63 in the manner shown in Figs. 4, 5 and 6. When the dial is moved in the clockwise direction, the member 47 moves with it and this member carries the projection 54 with it in the manner shown in Fig. 5. As the dog 63 moves from the tangential portion 65 of the flange 67 onto the arcuate portion of lesser radius, the dog 63 is swung relative to the latch member 55 against the tension of the light spring 66 into the position shown in Fig. 5. When any return, no matter how slight, of the dial is made or is permitted, the outer roughened end of the dog 63 grabs the inner roughened surface of the flange 67 so that the dog tends to remain stationary while the member 57 is being returned by the spring 59.

Figure 6:
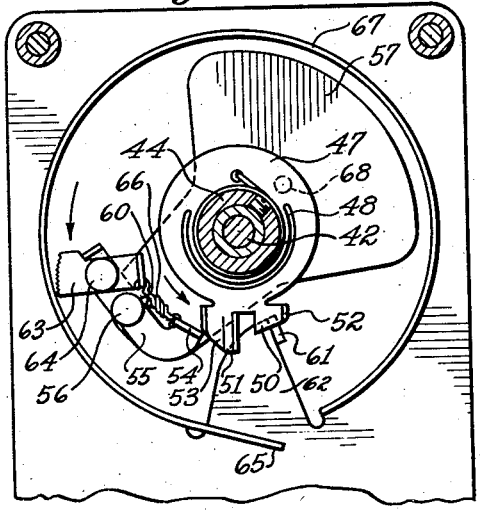
Fig. 6 is a still similar view showing the manner in which the driving element connected with the dial is separated from the element actuated thereby under certain conditions.

A very slight return movement brings the dog 63 into its position in Fig. 6 and in this position the wedge-shaped extremity 54 of the latch member 55 moves clear of the smaller projection 50. When this occurs, the member 57 is free to return to its initial position notwithstanding anything that the patron or operator may do to the dial 39. The only thing which can be done is to permit the dial to return to its normal position which is effected by the spring 45. This spring is sufficiently strong to cause the cam portion 52 of the projection 50 to rise outwardly and pass over the wedge-shaped end 54 of the latch member 55.

As will hereinafter be described, the return movement of the member 57 is controlled and limited by a governor. If the customer tries to make the dial work faster by actuating it in the reverse direction, then the resiliency of the member 47 is sufficient to enable its projection 51 to ride up the wedge-shaped or cam-shaped end 54 of the latch member 55 so that the member 47 and the dial, which is rigidly connected thereto, return to their initial position before the member 57. When, however, the member 57 does return to its initial position, the associated spring 59 is sufficiently strong to force the wedge-shaped end 54 of the latch member 55 past the projection 51 into its normal position.

In the normal operation of the device, the projection 54 will move outwardly beyond the projection 50 when the dog 63 is canted as shown in Fig. 6. The end 54 will not be moved outwardly beyond the projection 51 so that the projection 51 and the latch member 55 are returned to normal position together. If, however, any attempt is made to actuate the dial intermittently in opposite directions or if any attempt is made to force the return of the dial, then the dial will be separated completely from the member 57 and from elements controlled thereby.

The member 57 returns to its initial position with the dog 63 dragging along the flange 67 in the manner shown in Fig. 6. When the dog 63 reaches the tangential portion or portion of greater radius 65, clearance is provided between the flange and the dog. Near the end of the return movement of the member 57, the lug 60 engages the stationary lug 61 so that the first said lug is forced to the left-hand end of its opening 60'. The member 57 is thereby stopped.

The engagement between the lug 60 and the lug 61 swings the latch 55 in the counterclockwise direction so as to bring the dog 63 into the relation in which it is shown in Fig. 4. It may here be remarked that before the next dialing, the furcations 50 and 51 must engage opposite sides of the wedge-shaped member 54 in the manner shown in Fig. 4 so that at the time of the next dialing, the latch member 55 is held by the slight friction of the furcations 50 and 51 so that it remains engaged therewith until reverse movement of the member 57. When that member is reversed, the dog 63 no longer slips along the flange 67. It digs into the flange 67 and it jackknifes the latch member 55 so that its wedge portion 54 is moved outwardly beyond the furcation 50.

Figure 2:
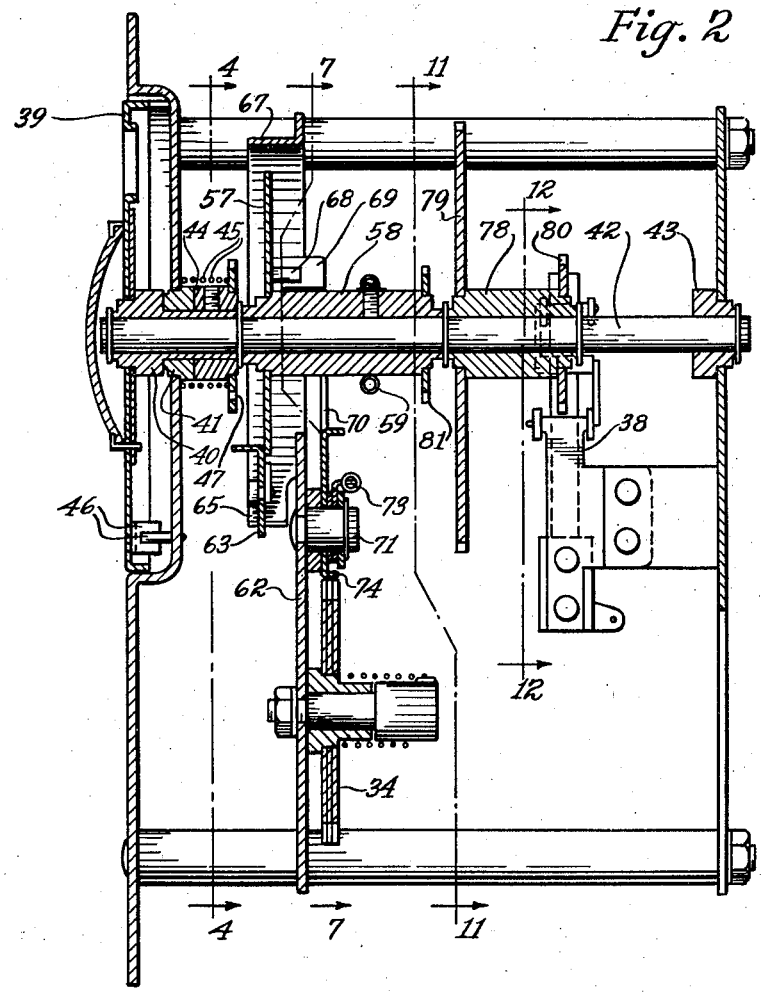
Fig. 2 is a sectional view therethrough taken on the line 2—2 of Fig. 2 of the mechanism carried by the cover of the cabinet.
Figure 3:
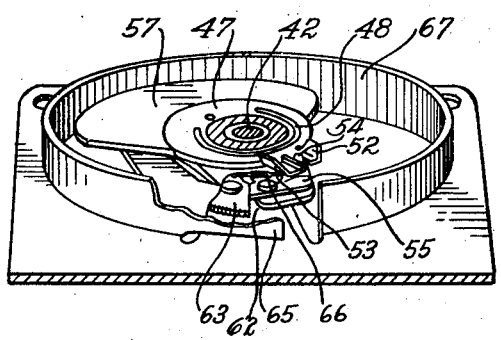
Fig. 3 is a perspective view showing the mechanism which controls the release of the impulser from the dial.

The rear or inner side of the member 57 carries a rearwardly extending pin 68. The pin 68 is adapted to engage, in the normal position of the member 57, a lug 69 on the end of a lever 70 pivotally mounted upon a stud shaft 71 rigidly mounted on the wall 62 as best seen in Fig. 2. The stud shaft 71 also serves as a pivotal support for the escapement dog 35 and a similar but oppositely directed dog 72.

The escapement dogs 35 and 72 are biased towards each other by a spring 73 connected to their rear or uppermost ends, that is, the ends remote from their ratchet engaging portions. The approach of the ratchet engaging portions of the dog 35 and 72 is limited by a rearwardly turned lug 74 against which the dogs 35 and 72 abut in the manner shown in Figs. 7 to 10.

The lever 70 is biased towards the right by means of a spring 75 so that it tends to move the escapement dog 35 away from the ratchet wheel 34 and tends to move the escapement dog 72 towards the ratchet wheel. Normally the pin 68 holds the lever 70 in its position shown in Fig. 7. When the pin 68 which is mounted on the member 57 is displaced by the initiation of dialling, the lever 70 is moved to the right by the spring 75 so as to withdraw the tooth of the dog 35 away from the ratchet wheel 34. Before this happens, the tooth of the dog 72 has entered into a recess between two adjacent teeth of the ratchet wheel 34 so that the clockwise movement of the ratchet wheel 34 has been limited to approximately a quarter of a tooth.

Figure 8:
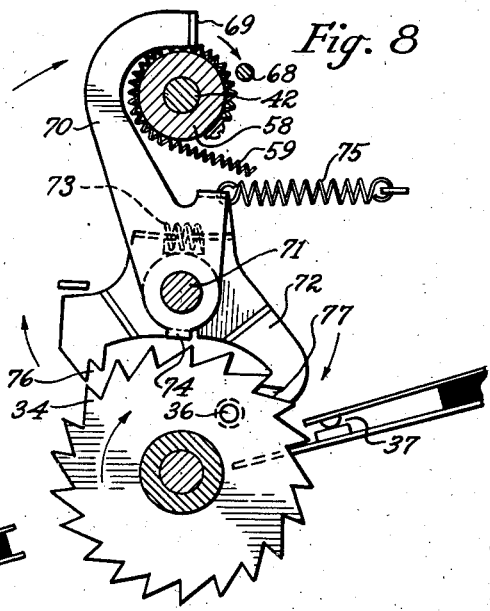
Fig. 8 is a similar view showing the relation of the elements during the first dialing.
Figure 9:
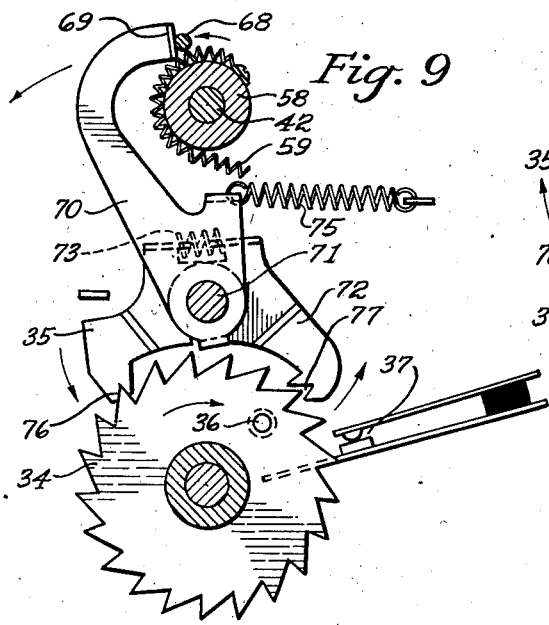
Fig. 9 is a view similar to Fig. 7 showing the relation of elements after the first dialing.
Figure 10:
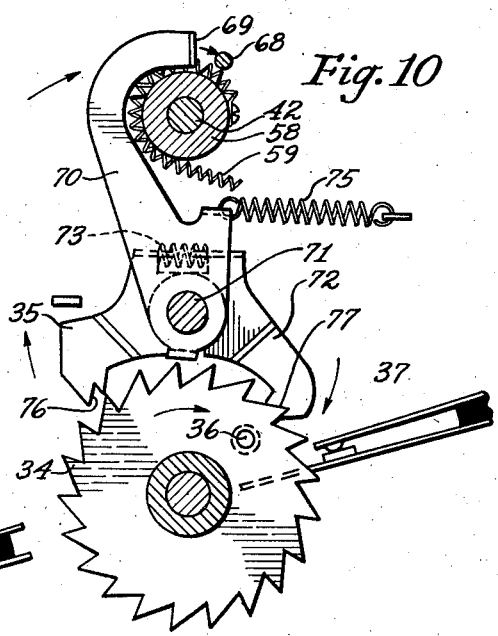
Fig. 10 is a view similar to Fig. 8, showing the relation of the elements during the second dialing.

When the first dialling is completed, the member 57 returns to its initial position, carrying the pin 68 from its position in Fig. 8 back to its position in Fig. 9. This return movement swings the dogs 35 and 72 in the opposite direction but in this case, before the dog 72 has moved out of the tooth recess in which it is shown in Fig. 8, the recess 76 of the tooth of the dog 35 has become located in enclosing relation to a tooth of the ratchet wheel 34. The recess or the double tooth on the escapement member 35 is such that this engagement permits another movement of the ratchet wheel 34 in the clockwise direction to the extent of a quarter of a tooth space. The similar recess 77 on the dog 72 is brought into operation at the beginning of the next dialling step as shown in Fig. 10. effecting another quarter of a tooth movement for the ratchet wheel 34.

The return movement of the pin 68 brings the mechanism back to the position in which it is shown in Fig. 7 with the exception that the pin 36 has moved one whole tooth nearer the position in which it is able to open switch 37. It may here be noted that this switch opening movement is effected by the pin 36 during the fourth quarter of a tooth movement of the ratchet wheel 34.

Consequently, the net result is that a single coin inserted in the coin slot 25 moves the ratchet wheel 34 one full tooth in the counterclockwise direction and that a dial movement, a return movement, a second dial movement, and a final return movement effect the step-by-step return of the ratchet wheel through a distance corresponding to one tooth space.

Figure 11:
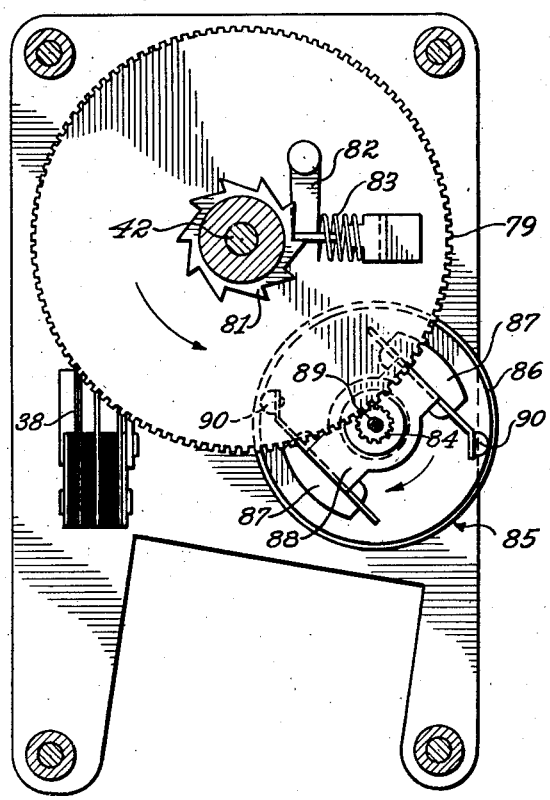
Fig. 11 is a sectional elevation of the wall box taken on the line 11—11 of Fig. 2 showing the governor and the ratchet mechanism which permits actuation of the dial in one direction without operation of the governor.
Figure 12:
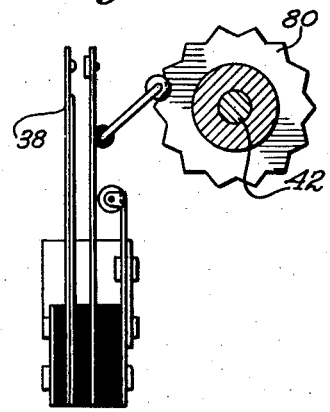
Fig. 12 is a sectional detail taken on the line 12—12 of Fig. 2 showing the impulsing switch.
Figure 13:
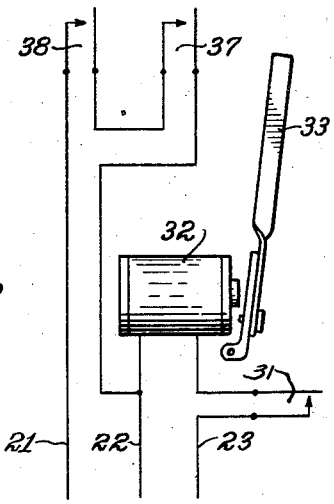
Fig. 13 is a wiring diagram of the connections within the wall box or remote control unit.

Behind the sleeve 58 a further sleeve 78 (Fig. 2) is mounted on the shaft 42. The sleeve 78 carries a large gear 79 and a star wheel 80. The end of the sleeve 58 adjacent the gear wheel 79 carries a small ratchet wheel 81 which is adapted to engage a dog 82 mounted on the gear wheel 79 as best shown in Fig. 11. The dog 82 is biased towards the ratchet wheel 81 by means of a spring 83.

It will readily be understood that during a dial movement in the clockwise direction, the small ratchet wheel 81 merely slips past the dog 82 without effecting any movement of the gear 79. When, however, the dial is released or when the member 57 becomes released from the dial, the ratchet wheel 81 is rotated in the counterclockwise direction and it carries the gear 79 with it. The gear 79 meshes with a pinion 84 of a centrifugal governor 85. This centrifugal governor may suitably comprise a stationary cup 86, weights 87 carried by a resilient yoke or U-shaped member 88 which is mounted on the spindle 89 which rigidly carries the pinion 84.

It will readily be understood that when the gear wheel 79 is being rotated in the counterclockwise direction, as viewed in Fig. 11, the weights 87 will be rotated at high speed and will be thrown out by centrifugal force, bringing the brake members 90 into engagement with cylinder wall of the cup 86, thus controlling the speed of the gear 79 and incidentally controlling the speed at which the signal impulses are sent over the lines.

The star wheel 80 may be made of any suitable insulating material and it is arranged so that it closes the switch 38 a desired number of times depending upon the initial displacement of the dial 39. The arrangement is such that if the patron inserts his finger in the opening O on the dial and swings the dial until his finger engages the finger stop 91 and then releases the dial, the return of the member 57 will actuate the star wheel 80 through an angle corresponding to three teeth, with the result that the wire 22 will be effectively connected to the signal wire 21 three times. If the operator dialed "7," the wires 22 and 21 would be effectively connected ten times and, ten impulses would be transmitted over the lines 22 and 21.

Of course it will be understood that the operation of the dial will have no effect in connecting the wires 21 and 22 unless the switch 37 is closed. The closing of this switch is effected exclusively by the insertion of a coin or coins in the coin slot.

Although the invention has been described in connection with specific details of a preferred embodiment thereof, it must be understood that such details are not intended to be limitative of the invention except in so far as set forth in the accompanying claims.

I claim:

1. A remote control unit for selective automatic phonographs comprising a manually operable dial, a first member connected to said dial for movement therewith, a second member adapted to move with the first member, a spring tending to return the second member to initial position, a latch on one of the members for connecting the first and second members together, means frictionally engaging said latch whereby reverse movement of the dial unlatches said latch and the second member returns to zero position, and impulser means operably connected to the second member during its return.

2. A remote control unit for selective automatic phonographs comprising a manually operable dial, a first member connected to said dial for movement therewith, a second member adapted to move with the first member, a spring tending to return the second member to initial position, a latch on one of said members, a resilient bifurcated member on the other one of said members, said latch having a cam-shaped end engaged between the furcations, a friction member on said latch, means providing an arcuate friction surface on which said friction member is adapted to drag during dialing, said friction member being pivotally mounted on said latch and inclined to said friction surface in such manner that the latch is swung and released from between the furcations when the dial is moved in reverse direction, and impulse means operatively connected to the second member during its return movement.

3. A remote control unit for selective automatic phonographs comprising a manually operable dial, a first member connected to said dial for movement therewith, a second member adapted to move with the first member, a spring tending to return the second member to initial position, a latch on one of said members, a resilient bifurcated member on the other one of said members, said latch having a cam-shaped end engaged between the furcations, a friction member on said latch, means providing an arcuate friction surface on which said friction member is adapted to drag during dialing, said friction member being pivotally mounted on said latch and inclined to said friction surface in such manner that the latch is swung and released from between the furcations when the dial is moved in reverse direction, impulse means operatively connected to the second member during its return movement, and means engaged by said latch in its normal position for swinging the latch into latching position and for moving said friction member outwardly, said friction surface being displaced outwardly from its general arcuate shape adjacent the position of said friction member.

4. A remote control unit for selective automatic phonographs comprising a manually operable dial, a first member connected to said dial for movement therewith, a second member adapted to move with the first member, a spring tending to return the second member to initial position, a latch on one of said members, a resilient bifurcated member on the other one of said members, said latch member having a cam-shaped end engaged between the furcations, a friction member on said latch, means providing an arcuate friction surface on which said friction member is adapted to drag during dialing, said friction member being pivotally mounted on said latch and inclined to said friction surface in such manner that the latch is swung and released from between the furcations when the dial is moved in reverse direction, impulse means operatively connected to the second member during its return movement, a light spring and abutment members on said friction member and latch, said spring being arranged to be extended whenever the friction member drags over the friction surface during dialing, means engaged by said latch in its normal position for swinging the latch into latching position and for moving said friction member outwardly, said friction surface being displaced outwardly from its general arcuate shape adjacent the normal position of said friction member, a governor preventing rapid return of the second member, the bifurcated member being sufficiently resilient to enable its furcations to move over the cam-shaped end of the latch whereby the bifurcated member will be disengaged from the latch on forcible reverse movement of the dial and the cam end of the latch will re-engage with the bifurcated member at their normal positions.

5. A remote control unit for selective automatic phonographs comprising a manually operable dial, a first member connected to said dial for movement therewith, a second member adapted to move with the first member, a spring tending to return the second member to initial position, a latch on one of said members, a resilient bifurcated member on the other of said members, said latch member having a cam shaped end engaged between the furcations, a friction member on said latch, means providing an arcuate friction surface on which said friction member is adapted to drag during dialing, said friction member being pivotally mounted on said latch and inclined to said friction surface in such manner that the latch is swung and released from between the furcations when the dial is moved in reverse direction, an impulse switch operatively connected to the second member during its return movement, a light spring and abutment members on said friction member and latch, said spring being arranged to be extended whenever the friction member drags over the friction surface during dialing, means engaged by said latch in its normal position for swinging the latch into latching position and for moving said friction member outwardly, said friction surface being displaced outwardly from its general arcuate shape adjacent the normal position of said friction member, a governor preventing rapid return of the second member, the bifurcated member being sufficiently resilient to enable its furcations to move over the cam-shaped end of the latch whereby the bifurcated member will be disengaged from the latch on forcible reverse movement of the dial and the cam end of the latch will re-engage with the bifurcated member at their normal positions, a second switch, coin controlled stepping means normally holding the second switch open and arranged to be stepped away from its switch opening position, and means controlled by the second member at the end of its return movement for moving said stepping means one-half step towards its switch opening position.

MARION R. WINKLER.

REFERENCES CITED

The following references are of record in the file of this patent:

UNITED STATES PATENTS

| Number | Name | Date |
|---|---|---|
| 884,441 | Weser | Apr. 14, 1908 |
| 1,652,919 | Walker | Dec. 13, 1927 |
| 2,230,486 | Durant | Feb. 4, 1941 |
| 2,265,124 | Andres | Dec. 9, 1940 |
| 2,323,255 | Sutherland | June 29, 1943 |
| 2,354,896 | Weiler | Aug. 1, 1944 |